United States Patent
Sangha et al.

(10) Patent No.: US 10,081,245 B2
(45) Date of Patent: Sep. 25, 2018

(54) CRADLE TO BODY JOINT RELEASE MECHANISM

(71) Applicant: GM GLOBAL TECHNOLOGY OPERATIONS LLC, Detroit, MI (US)

(72) Inventors: Balbir S. Sangha, Ajax (CA); Zohir Molhem, Rochester Hills, MI (US); Frederick M. Marquardt, Commerce, MI (US); Michael A. Ray, Sterling Heights, MI (US); Oday F. Hassan, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 188 days.

(21) Appl. No.: 15/191,646

(22) Filed: Jun. 24, 2016

(65) Prior Publication Data

US 2017/0368930 A1   Dec. 28, 2017

(51) Int. Cl.
*B60K 17/04* (2006.01)
*B60K 17/24* (2006.01)

(52) U.S. Cl.
CPC .............. *B60K 17/04* (2013.01); *B60K 17/24* (2013.01)

(58) Field of Classification Search
CPC ........ B60K 14/04; B60K 14/24; B60K 17/04; B60K 17/24
USPC ....................................................... 296/204
See application file for complete search history.

(56) References Cited

U.S. PATENT DOCUMENTS

| 5,605,353 | A | * | 2/1997 | Moss | B62D 21/09 188/376 |
| 5,752,885 | A | * | 5/1998 | Kobayashi | F16F 15/123 192/205 |
| 6,029,765 | A | * | 2/2000 | Chou | B60K 5/1216 180/292 |
| 6,367,869 | B1 | * | 4/2002 | Baccouche | B62D 21/155 280/784 |
| 6,679,523 | B2 | * | 1/2004 | Yamamoto | B60G 7/02 180/311 |
| 8,985,630 | B2 | * | 3/2015 | Sangha | B62D 27/065 280/124.109 |
| 9,266,563 | B1 | * | 2/2016 | Han | B62D 21/11 |
| 9,616,931 | B2 | * | 4/2017 | Sangha | B62D 21/155 |
| 9,751,565 | B2 | * | 9/2017 | Tatsuwaki | B62D 21/155 |
| 2001/0002761 | A1 | * | 6/2001 | Tsuruta | B60N 2/4221 296/187.09 |

(Continued)

*Primary Examiner* — Hilary L Gutman
(74) *Attorney, Agent, or Firm* — Quinn IP Law (57) ABSTRACT

A mount assembly for attaching a cradle to a vehicle frame includes an inner sleeve. The inner sleeve defines an inner sleeve aperture having a first aperture portion having a first diameter and a second aperture portion having a second diameter. The mount assembly also includes a bushing having a bushing body and configured to extend through the first aperture portion. The mount assembly additionally includes a fuse fixed to the bushing body to separate the first and second aperture portions. The mount assembly also includes a fastener configured to extend through the bushing body and an aperture in the vehicle frame for attaching the cradle to the frame. The fuse is configured to separate from the bushing body under a predetermined load to permit the fastener to shift from the first aperture portion to the second aperture portion and the cradle to shift relative to the frame.

17 Claims, 7 Drawing Sheets

(56) References Cited

U.S. PATENT DOCUMENTS

| | | | | |
|---|---|---|---|---|
| 2006/0255625 A1* | 11/2006 | Kitoh | ............ | B62D 21/155 |
| | | | | 296/204 |
| 2006/0284449 A1* | 12/2006 | Miyahara | ............ | B62D 21/11 |
| | | | | 296/204 |
| 2011/0285176 A1* | 11/2011 | Baccouche | ............ | B62D 21/11 |
| | | | | 296/204 |
| 2012/0286543 A1* | 11/2012 | Lee | ............ | B62D 21/11 |
| | | | | 296/204 |
| 2013/0026796 A1* | 1/2013 | Wagner | ............ | B23K 26/28 |
| | | | | 296/204 |
| 2013/0181481 A1* | 7/2013 | Baccouche | ............ | B62D 21/155 |
| | | | | 296/187.08 |
| 2013/0285416 A1* | 10/2013 | Fukushi | ............ | B62D 21/11 |
| | | | | 296/204 |
| 2016/0375939 A1* | 12/2016 | Peschansky | ............ | B62D 25/2009 |
| | | | | 296/204 |

* cited by examiner

CRADLE TO BODY JOINT RELEASE MECHANISM

TECHNICAL FIELD

The present disclosure relates to a release mechanism for a cradle to body joint in a vehicle.

BACKGROUND

Typically, a vehicle includes a structure for enclosing and supporting various vehicle systems, as well as the vehicle passengers. Heavy-duty vehicles, such as pick-up trucks and vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination monocoque structure with a subframe for carrying the vehicle's powertrain. Frequently, additional structural members are used to buttress the vehicle structure, as well as for supporting various chassis and powertrain subsystems.

SUMMARY

A mount assembly for attaching a cradle to a vehicle frame having a frame aperture and configured to support a vehicle subsystem is disclosed in a first embodiment. The mount assembly includes an inner sleeve. The inner sleeve defines an inner sleeve aperture having a first aperture portion characterized by a first diameter and a second aperture portion characterized by a second diameter. The mount assembly also includes a bushing having a bushing body and configured to extend through the first aperture portion. The mount assembly additionally includes a fuse fixed to the bushing body and configured to separate the first aperture portion from the second aperture portion. The fuse is configured as a barrier separating the first aperture portion from the second aperture portion. The mount assembly also includes a fastener configured to extend through each of the bushing body and the frame aperture for attaching the cradle to the vehicle frame. The fuse is configured to separate or break away from the bushing body under a predetermined load and thereby permit the fastener to shift from the first aperture portion to the second aperture portion and the cradle to shift relative to the vehicle frame at the frame aperture.

The fuse can be one or more separate components attached to the bushing body or be an integral part of the bushing body, i.e., wherein the bushing body defines the fuse.

The bushing body may include a bushing wall. Furthermore, the fuse can be configured as at least one reduced-thickness section of the bushing wall.

The bushing may include a section extending away from the bushing body and the fuse. The subject bushing section may be configured to define the second aperture portion.

The bushing body can be constructed from aluminum.

The fastener can be configured as a bolt that includes a bolt head defined by a bolt head diameter. The bolt head diameter can be greater than the first diameter of the first aperture portion. The fastener can additionally include a nut fixed, such as welded, to the vehicle frame at the at least one frame aperture and configured to engage the bolt.

The second diameter of the second aperture portion can be greater than the first diameter of the first aperture portion. The bolt head diameter can be smaller than the second diameter of the second aperture portion. In such an embodiment, the bolt head can be pulled through the second aperture portion after the bolt has shifted from the first aperture portion to the second aperture portion.

The vehicle structure may additionally include a frame connector attached to the frame and to the cradle via the bolt. The bolt head can be pulled through the frame connector to separate or detach therefrom after the bolt has shifted from the first aperture portion to the second aperture portion.

Either the frame or the cradle can include a deflector configured to deflect the cradle away from the frame, and thereby pull the bolt head through the frame connector and separate the bolt head therefrom.

The mount assembly can include an outer sleeve arranged concentrically with respect to the inner sleeve. The mount assembly can also include a resilient member is arranged between the inner sleeve and the outer sleeve and configured to minimize a transfer of vibrations between the cradle and the frame, i.e., to isolate the cradle from the frame.

Each of the inner and outer sleeves can be constructed from plastic.

The vehicle subsystem can be a vehicle drivetrain subassembly.

A vehicle structure having such a mount assembly, a cradle, and a vehicle frame is disclosed in a second embodiment.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
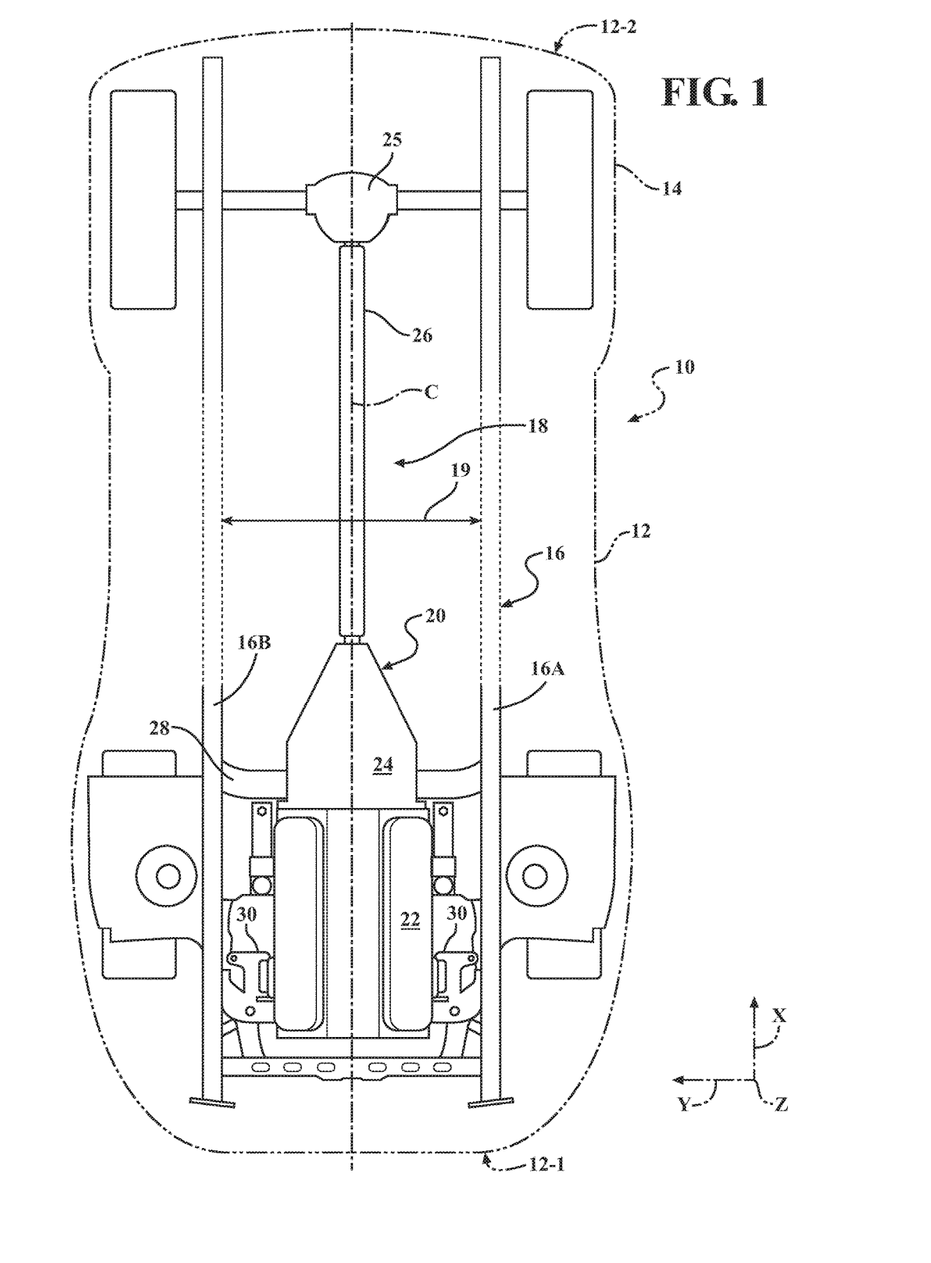
FIG. 1 is a schematic top view of a vehicle structure supporting a vehicle drivetrain.

Referring to the drawings, wherein like reference numbers refer to like components, FIG. 1 shows a perspective schematic view of a vehicle 10 having a vehicle structure 12 that includes a front portion 12-1 and a rear portion 12-2.

The vehicle structure 12 is made up of a vehicle body 14 constructed from a number of components and sub-structures, as understood by those skilled in the art, and a frame 16. The vehicle body 14 is characterized by a longitudinal centerline C that is arranged substantially along an X-axis and orthogonal to a Y-axis. The vehicle body 14 is attached to the frame 16, thus enabling a support structure for a vehicle suspension (not shown) and wheels, while also supporting vehicle subsystems, such as a drivetrain subassembly 18, passengers, and cargo. As shown, the frame 16 is arranged in the general plane of the vehicle 10, substantially defined by the X and Y axes.

As shown, the frame 16 includes two frame rails, 16A and 16B, separated in vehicle structure 12 by a distance 19. The frame rails 16A and 16B may be substantially parallel with respect to each other, e.g., within +/−5° of true parallel. The frame rails 16A, 16B can extend substantially the length of the vehicle body 14, which is depicted via the dashed line sections in FIG. 1, defining a structure identified in the art as "body-on-frame", or be configured as partial rails that exclude the dashed line sections, thereby defining a structure identified in the art as a "unibody". The first and second frame rails 16A, 16B are arranged substantially symmetrically with respect to the centerline C. As used herein, the term "substantially symmetrically" may denote a positioning of specified components that is within +/−5 cm of true symmetry with respect to the centerline C. Frame rails 16A and 16B are typically made from steel, and are formed by one or more appropriate methods, such as hydro-forming, roll-forming, stamping, and welding. Accordingly, the shown portion of frame 16 may be part of a body-on-frame heavier-duty work vehicle, such as a pick-up truck or a van, or of a lighter-duty unibody passenger vehicle, such as an automobile. As appreciated by those skilled in the art, the disclosed vehicle structure 12 may be used in a rear-wheel drive, a front-wheel drive, or a four-wheel drive configuration.

Figure 2:
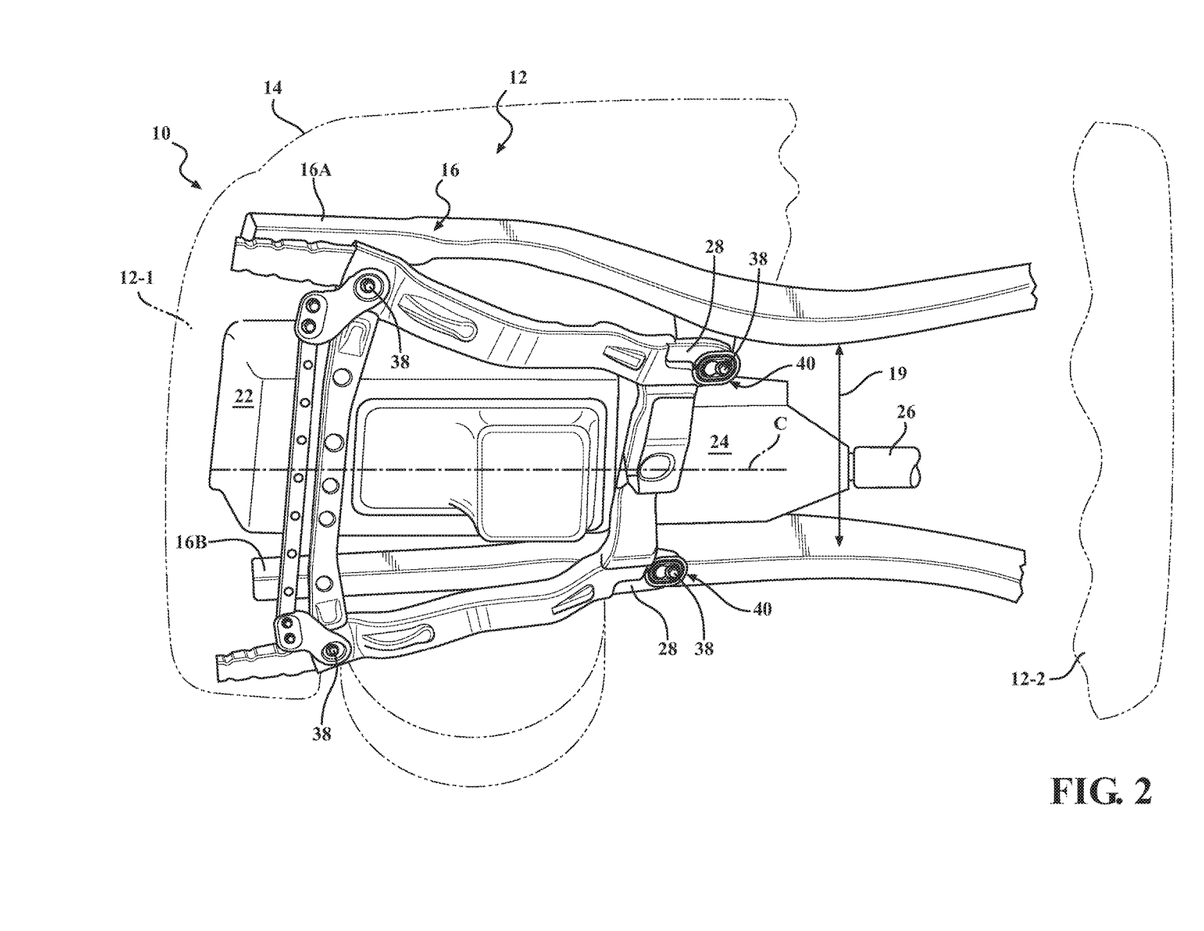
FIG. 2 is a schematic perspective bottom view of the vehicle structure shown in FIG. 1, specifically depicting a frame and a powertrain cradle.

The drivetrain subassembly 18 includes a powertrain 20 having an internal combustion engine 22 coupled to a transmission assembly 24. The powertrain 20 may be positioned proximate the front portion 12-1 (as shown in FIGS. 1-2) of the vehicle structure 12, or proximate the rear portion 12-2. The drivetrain subassembly 18 may also include a driveshaft 26 coupled to the transmission assembly 24 and configured to transmit torque of the engine 22 to driven wheels via a differential 25, which may be positioned proximate the rear portion 12-2, as shown in FIG. 1. In addition to engine 22 and the transmission assembly 24, powertrain 20 may also include an electric motor/generator (not shown) for hybrid propulsion of the subject vehicle, or a fuel-cell, as understood by those skilled in the art. Transmission assembly 24 may also include a gear train and torque transmitting members (not shown) operatively connecting the engine 22 and the driveshaft 26, and arranged to enable selection of appropriate gear ratios for most effective propulsion of the vehicle 10.

The vehicle structure 12 also includes a cradle 28 mounted under the body 14, i.e., in a Z-axis direction and generally parallel to the frame 16, to each of the first and second frame rails 16A, 16B. The cradle 28 is each arranged substantially symmetrically with respect to the centerline C and is configured to support a vehicle subsystem. Although the specific vehicle subsystem supported by the cradle 28 can be any subsystem employed in the vehicle 10, the specific subsystem depicted in the figures is the drivetrain subassembly 18 that includes the powertrain 20. The powertrain 20 is mounted to the cradle 28 via engine mounts 30, with one mount positioned on either side of the engine (because a perspective view is illustrated in FIG. 1, only a single such mount 30 is shown). The engine mounts 30 are specially designed to support the mass of engine 20, as well as to absorb vibration of a running engine, and withstand the torque couple that is generated by the engine during propulsion of the vehicle 10. The mass and vibration of the transmission assembly 24, as well as the torque couple generated by the engine 18 during propulsion may be fully supported by the cradle 28 or an additional support via a separate transmission mount (not shown) may be employed.

Figure 3:
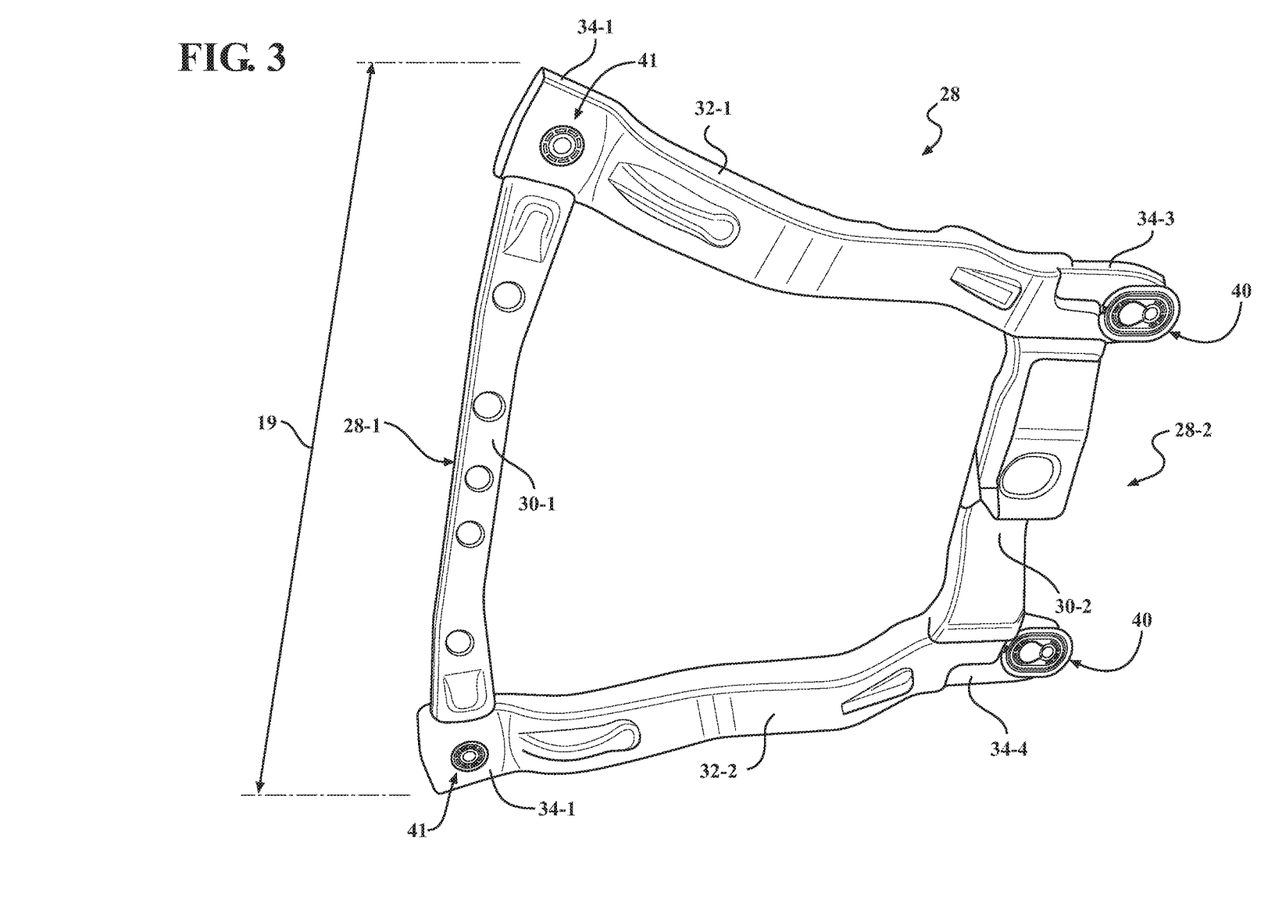
FIG. 3 is a schematic perspective bottom view of the powertrain cradle shown in FIG. 2, including mount assemblies, according to the disclosure.

As shown in FIGS. 2 and 3, a specific embodiment of the cradle 28 can be a single-material, welded support substructure defined by a first, forward end 28-1 and a second, rearward end 28-2. As shown in FIG. 3, the cradle 28 includes a first cross-member 30-1 and a second cross-member 30-2, wherein each cross-member is arranged substantially transverse to the centerline C and spanning the distance 19 between the first and second frame rails 16A, 16B. The cradle also includes a first side section 32-1 and a second side section 32-2, each fixed to the first and second cross-members 30-1, 30-2. the cradle 28 includes forward nodes 34-1 and 34-2 and rearward nodes 34-3 and 34-4. The cradle 28 can be mounted to the first frame rail 16A proximate the first end 28-1 and proximate the second end 28-2 at the forward node 34-1 and the rear node 34-3. Additionally, the cradle 28 can be mounted to the second frame rail 16B proximate the first end 28-1 and proximate the second end 28-2 at the forward node 34-2 and the rear node 34-4. As shown in FIG. 2, the cradle 28 is attached to the first and second frame rails 16A, 16B at individual frame apertures (not shown), each specifically configured to accept a respective fastener, generally indicated by numeral 38. Mounted in such fashion, the cradle 28 forms a rigid structure for supporting the powertrain 20 in the vehicle 10 via the frame 16. In addition to the single-material, welded embodiment of the cradle 28, a support sub-structure using a plurality of dissimilar material, fastened-together components is also envisioned.

Figure 4:
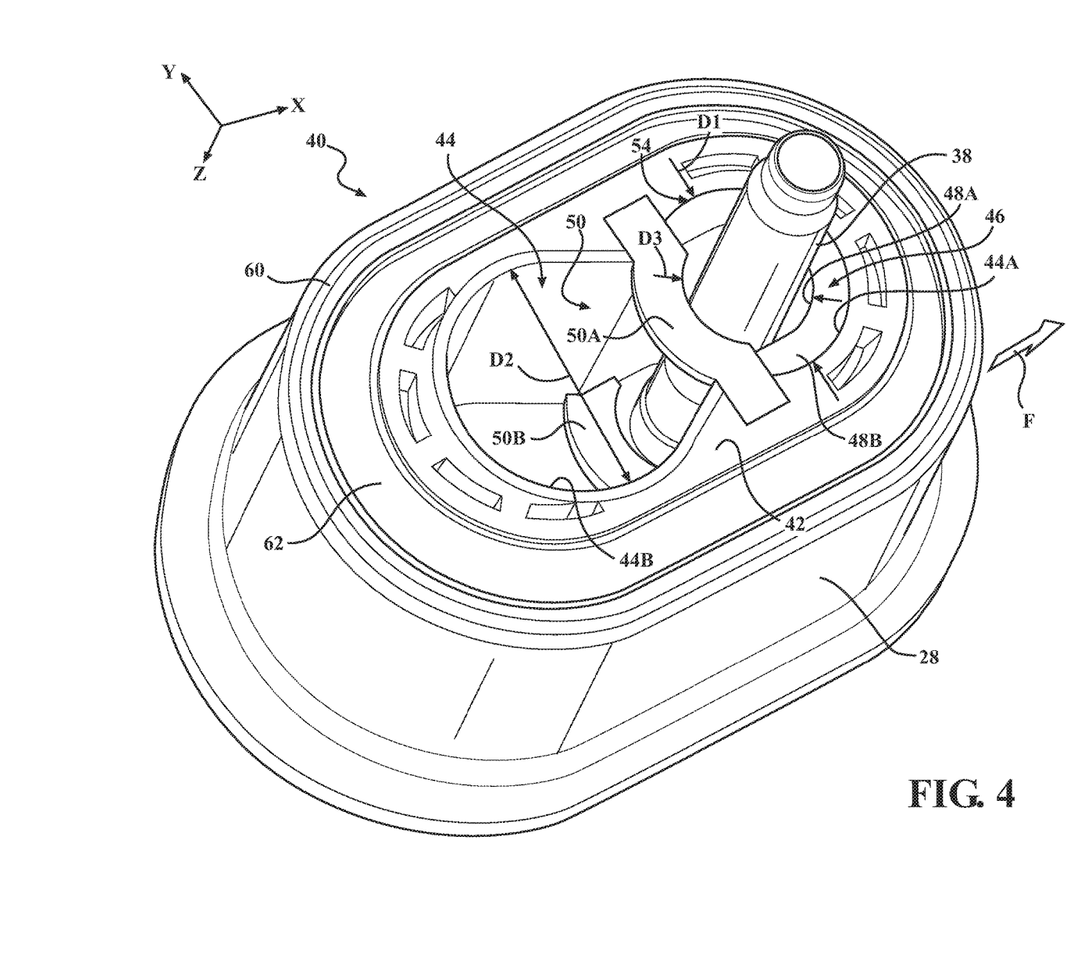
FIG. 4 is a schematic close-up perspective view of one embodiment of the mount assembly shown in FIG. 2.
Figure 5:
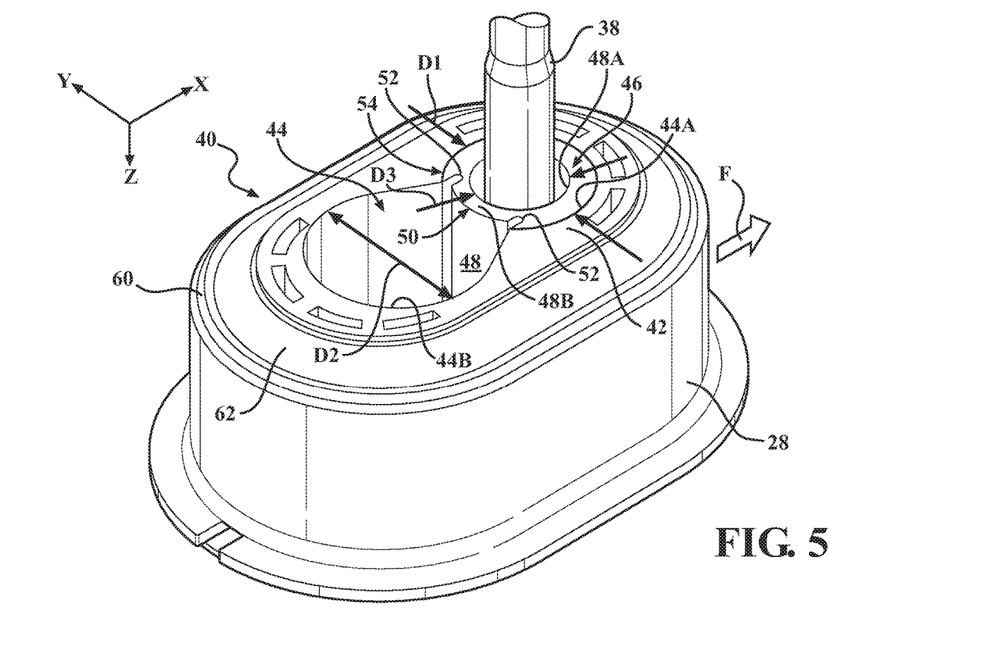
FIG. 5 is a schematic close-up top view of another embodiment of the mount assembly shown in FIG. 2.
Figure 6:
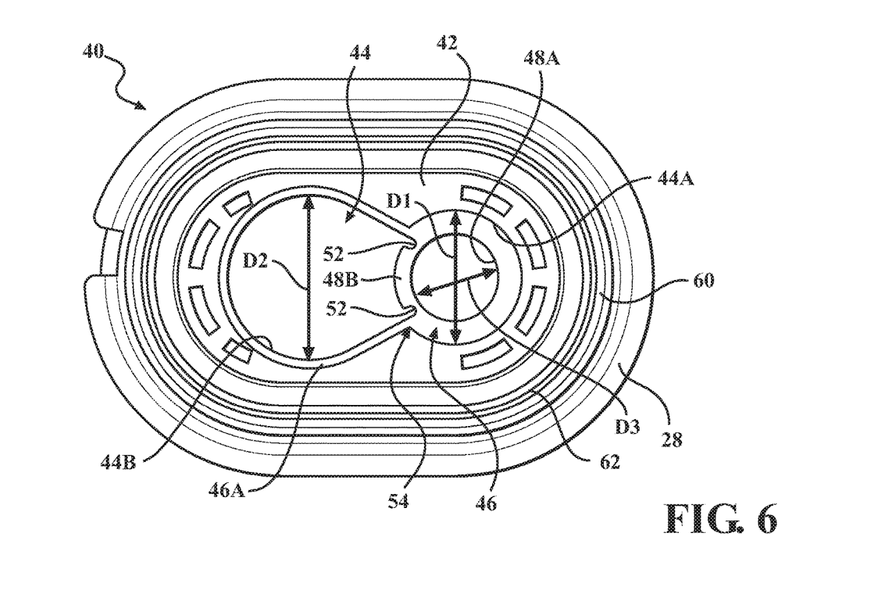
FIG. 6 is a schematic close-up top view of yet another embodiment of the mount assembly shown in FIG. 2.

As shown in FIG. 2, the vehicle structure 12 also includes mount assemblies 40 fixed to the cradle 28. The cradle 28 may be attached to the frame 16 via the mount assemblies 40 at rearward nodes 34-3, 34-4. As shown in FIGS. 4-6, the mount assembly 40 includes an inner sleeve 42. The mount assembly 40 also defines an inner aperture 44 having a first aperture portion 44A characterized by a first diameter D1 and a second aperture portion 44B characterized by a second diameter D2. The inner sleeve 42 can define each of the first aperture portion 44A and the second aperture portion 44B. The mount assembly includes a bushing 46 having a bushing body 48 configured to extend through the first aperture portion 44A. The mount assembly 40 also includes a fuse 50 arranged on the bushing body 48 and configured to separate the first aperture portion 44A from the second aperture portion 44B. The fuse 50 can be one or more separate components configured as a barrier separating the first aperture portion 44A from the second aperture portion 44B. The subject embodiment of the fuse 50 is shown in exemplary fashion as fuse components 50A and 50B in FIG. 4. The fuse 50, such as having the fuse components 50A and 50B, can be attached to the bushing body 48 by any known methods, such as various welding techniques, or appropriate fastener(s) (not shown). The bushing body 48 together with the fuse components 50A and 50B defines an aperture 48A having a diameter D3, which, as shown, is smaller than the diameter D1 and, as a result, smaller than the diameter D2.

In a separate embodiment, the bushing body 48 can be configured to define the fuse 50, i.e., the fuse can be an integrally formed part of the bushing body. Similar to the embodiment of FIG. 4, in the embodiment of FIG. 5, the fuse 50 separates the first aperture portion 44A from the second aperture portion 44B when the bushing 46 is positioned within the inner sleeve 42. The body 48 defines an aperture 48A having a diameter D3, which, as in the embodiment shown in FIG. 4, is smaller than each of the diameters D1 and D2. The bushing body 48 can be constructed from any rigid and tough material, such as aluminum or a specially engineered plastic. In a yet additional embodiment, shown in FIG. 6, the bushing 46 can include a section 46A extending away from the bushing body 48 and the fuse 50, and configured to define the second aperture portion 44B. Similar to the embodiments shown in FIGS. 4 and 5, in the embodiment of FIG. 6, the diameter D3 is smaller than each of the diameters D1 and D2.

The mount assembly 40 also includes one of the fasteners 38 configured to extend through each of the bushing body 48 and the frame aperture 36 to thereby attach the cradle 28 to the vehicle frame 16. The fuse 50 is configured to separate or break away from the bushing body 48 under a predetermined load F. The breaking away of the fuse 50 from the bushing body 48 permits the cradle 28 to shift relative to the frame 16 and the fastener 38. As the cradle 28 shifts relative to the frame 16 under the load F, the fastener 38 is effectively shifted from the first aperture portion 44A to the second aperture portion 44B. As can be seen in FIG. 3, the cradle 28 can be mounted to the frame 16 at forward nodes 34-1 and 34-2 via conventional mount assemblies 41, and at rearward nodes 34-3, 34-4 via the mount assemblies 40.

The bushing body 48 includes a bushing wall 48B. The fuse 50 can be configured as at least one reduced-thickness section 52 of the bushing wall 48B. The inner aperture 44 can include a transition 54 between the first aperture portion 44A and the second aperture portion 44B. As shown in FIG. 3, however, the fuse 50 is configured as two such reduced-thickness sections 52 arranged at the transition 54. When the fastener 38 is subjected to the predetermined load F, the fastener is forced to exit the boundaries of the bushing 46 by breaking the fuse 50 at the reduced-thickness section(s) 52 and shift to the second aperture portion 44B. As the fuse 50 is broken and the cradle 28 shifts relative to the frame 16, the energy from the load F is at least partially dissipated. As shown, the fastener 38 can be configured as a bolt including a bolt head 38A and a shank 38B. The bolt head diameter 38A can be defined by a bolt head diameter D4 that is greater than the first diameter D1 of the first aperture portion 44A. The fastener 38 may also include a nut 38C fixed, such as welded, to the vehicle frame 16 at the respective frame aperture 36 and configured to engage the shank 38B.

As shown, the second diameter D2 of the second aperture portion 44B is greater than the first diameter D1 of the first aperture portion 44A in the inner sleeve 42. The second diameter D2 of the second aperture portion 44B is also greater than the third diameter D3 of the bushing body aperture 48A. On the other hand, the bolt head diameter D4 of the fastener 38 is smaller than the second diameter D2 of the second aperture portion 44B. As a result, after the bolt portion of the fastener 38 has shifted from the first aperture portion 44A and the bushing body aperture 48A to the second aperture portion 44B under the load F, the bolt head 38A can be pulled through the second aperture portion. As additionally shown in FIGS. 7-8, frame connector(s) 56 can be used to additionally stiffen the vehicle structure 12. Each connector 56 can be attached through the cradle 28 to the frame 16 at a specific mount assembly 40 via the fastener 38. Under applied load F or a load that exceeds the magnitude of such a load, after the bolt portion of the fastener 38 has shifted from the first aperture portion 44A to the second aperture portion 44B, the bolt head 38A can be pulled through the frame connector 56 and separated or detached therefrom.

Figure 7:
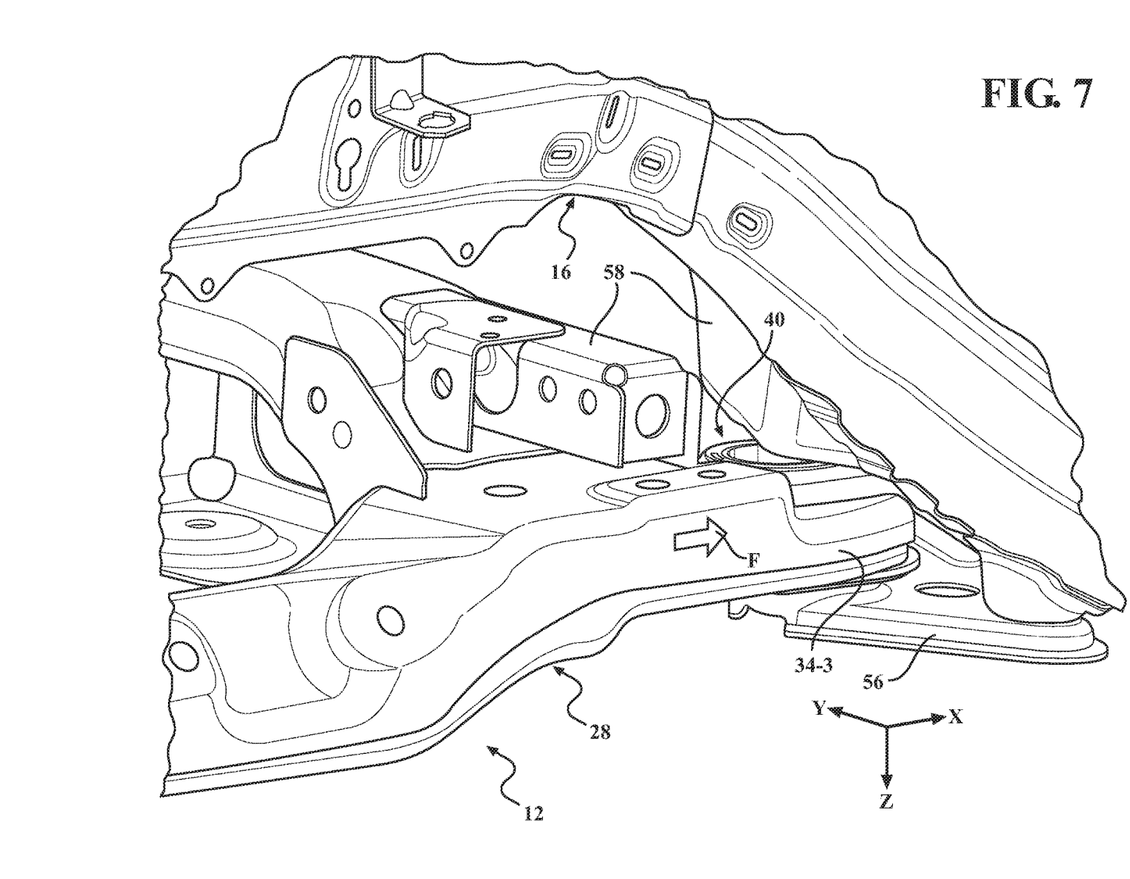
FIG. 7 is a schematic perspective view of the vehicle structure including the frame and the powertrain cradle connected via the mount assembly shown in any of the FIGS. 4-6, along with a frame stiffener and a deflector, according to the disclosure.
Figure 8:
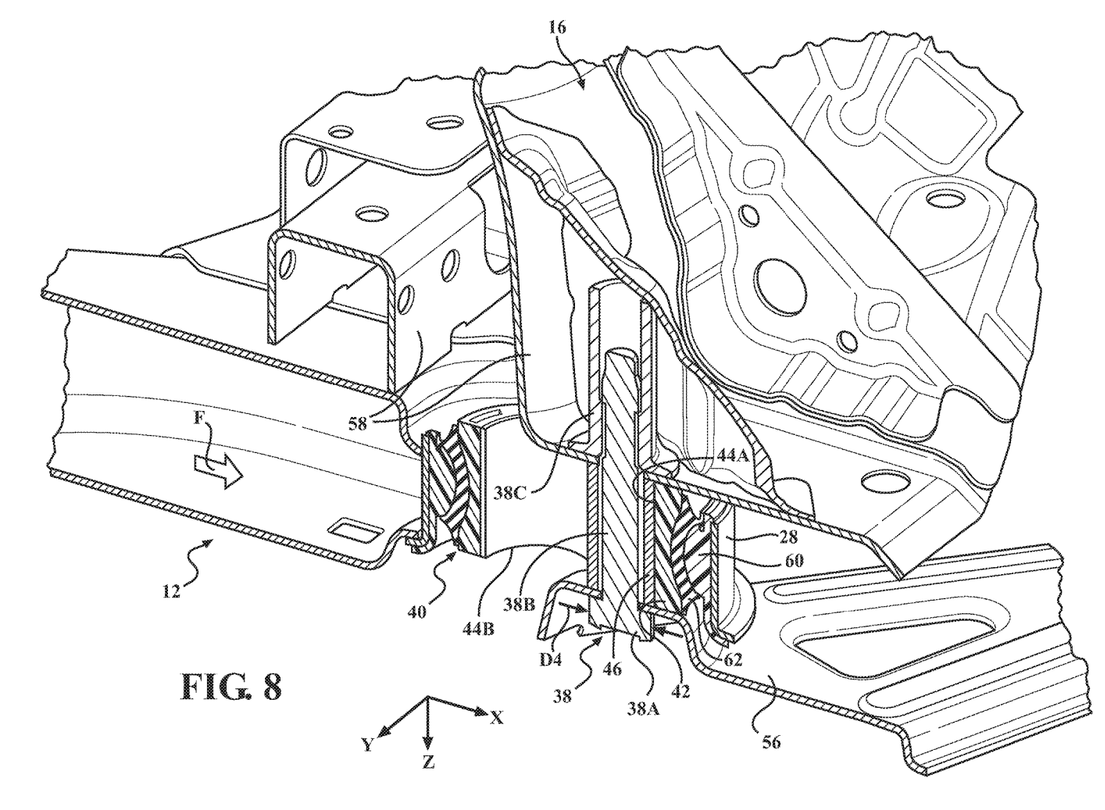
FIG. 8 is a schematic perspective partially cut-away view of the vehicle structure including the frame and the powertrain cradle shown in FIG. 7, according to the disclosure.

As additionally shown in FIGS. 7 and 8, the vehicle structure 12 may include a deflector 58. The deflector 58 may be formed together with the cradle 28 or attached, such as welded thereto. Alternatively, the deflector 58 can be attached to the frame 16. Additionally, the deflector can include corresponding individual structures on each of the frame 16 and the cradle 28 configured to interact with each other as the cradle 28 is shifted along the X-axis from the front portion 12-1 toward the rear portion 12-2. The deflector 58 is configured to deflect the cradle 28 away from the frame 16 in the Z-direction as the cradle shifts along the along an X-axis as the fastener 38 repositions from the first aperture portion 44A to the second aperture portion 44B. As the deflector 58 deflects the cradle 28 away and separates the cradle from the frame 16, the bolt head 38A can be pulled through the frame connector 56 and such that the bolt head is separated therefrom. During such conditions, the bolt portion of the fastener 38 can remain intact, i.e., the bolt head 38A and the shank 38B stay connected, however, the frame connector 56 may tear, thus permitting the bolt to come free and pull away from the frame connector.

With renewed reference to FIG. 2, the mount assembly 40 can also include an outer sleeve 60 arranged concentrically with respect to the inner sleeve 42. A resilient member 62 can be additionally arranged between the inner sleeve 42 and the outer sleeve 60. The resilient member 62 is configured to isolate the cradle 28 from the frame 16. In other words, the resilient member 62 is configured to minimize a transfer of vibrations between the cradle 28 and the frame 16 when the engine 22 is generating torque and the vehicle 10 is being propelled by the powertrain 20. Each of the inner and outer sleeves 42, 60 can be constructed from aluminum, engineered plastic, or other relatively light-weight, but tough material.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle structure comprising:
a vehicle body;
a vehicle frame defining a frame aperture and configured to support the vehicle body;
a cradle configured to be attached to the vehicle frame at the frame aperture and support a vehicle subsystem; and a mount assembly fixed to the cradle and defining an inner aperture having a first aperture portion and a second aperture portion, wherein the first aperture portion is characterized by a first diameter and the second aperture portion is characterized by a second diameter, the mount assembly including:
  an inner sleeve defining the first aperture portion;
  a bushing configured to extend through the first aperture portion and having a bushing body;
  a fuse one of directly attached to the bushing body and an integral part of the bushing body such that the bushing body defines the fuse, and configured to separate the first aperture portion from the second aperture portion; and
  a fastener configured to extend through each of the bushing body and the frame aperture to thereby attach the cradle to the vehicle frame;
  wherein the fuse is configured to separate from the bushing body under a predetermined load and thereby permit the fastener to shift from the first aperture portion to the second aperture portion and the cradle to shift relative to the vehicle frame at the frame aperture.

2. The vehicle structure of claim 1, wherein the fuse is an integral part of the bushing body, wherein the bushing body includes a bushing wall, and wherein the fuse is configured as at least one reduced-thickness section of the bushing wall.

3. The vehicle structure of claim 1, wherein the bushing includes a section extending away from the bushing body and the fuse and is configured to define the second aperture portion.

4. The vehicle structure of claim 1, wherein the fastener is configured as a bolt including a bolt head defined by a bolt head diameter greater than the first diameter of the first aperture portion.

5. The vehicle structure of claim 4, wherein:
  the second diameter of the second aperture portion is greater than the first diameter of the first aperture portion;
  the bolt head diameter is smaller than the second diameter of the second aperture portion; and
  the bolt head is pulled through the second aperture portion after the bolt has shifted from the first aperture portion to the second aperture portion.

6. The vehicle structure of claim 5, further comprising a frame connector attached to the vehicle frame and to the cradle via the bolt, wherein the bolt head is configured to be pulled through the frame connector and separated therefrom after the bolt has shifted from the first aperture portion to the second aperture portion.

7. The vehicle structure of claim 6, wherein one of the vehicle frame and the cradle includes a deflector configured to deflect the cradle away from the frame, and thereby pull the bolt head through the frame connector and separate the bolt head therefrom.

8. A vehicle comprising:
  a vehicle drivetrain subassembly; and
  a vehicle structure, including:
    a vehicle body;
    a vehicle frame defining a frame aperture and configured to support the vehicle body;
    a cradle configured to be attached to the vehicle frame at the frame aperture and support the vehicle drivetrain subassembly; and
    a mount assembly fixed to the cradle and including:
      an inner sleeve defining an inner sleeve aperture having a first aperture portion characterized by a first diameter and a second aperture portion characterized by a second diameter;
      a bushing configured to extend through the first aperture portion and having a bushing body;
      a fuse one of directly attached to the bushing body and an integral part of the bushing body such that the bushing body defines the fuse, and configured to separate the first aperture portion from the second aperture portion; and
      a fastener configured to extend through each of the bushing body and the frame aperture to thereby attach the cradle to the vehicle frame;
      wherein the fuse is configured to separate from the bushing body under a predetermined load and thereby permit the fastener to shift from the first aperture portion to the second aperture portion and the cradle to shift relative to the vehicle frame at the frame aperture.

9. The vehicle of claim 8, wherein the fuse is an integral part of the bushing body, wherein the bushing body includes a bushing wall, and wherein the fuse is configured as at least one reduced-thickness section of the bushing wall.

10. The vehicle of claim 9, wherein the bushing includes a section extending away from the bushing body and the fuse and is configured to define the second aperture portion.

11. The vehicle structure of claim 8, wherein the fastener is configured as a bolt including a bolt head defined by a bolt head diameter greater than the first diameter of the first aperture portion.

12. The vehicle of claim 11, wherein:
  the second diameter of the second aperture portion is greater than the first diameter of the first aperture portion;
  the bolt head diameter is smaller than the second diameter of the second aperture portion; and
  the bolt head is pulled through the second aperture portion after the bolt has shifted from the first aperture portion to the second aperture portion.

13. The vehicle of claim 12, further comprising a frame connector attached to the vehicle frame and to the cradle via the bolt, wherein the bolt head is configured to be pulled through the frame connector and separated therefrom after the bolt has shifted from the first aperture portion to the second aperture portion.

14. The vehicle of claim 13, wherein one of the vehicle frame and the cradle includes a deflector configured to deflect the cradle away from the vehicle frame, and thereby pull the bolt head through the frame connector and separate the bolt head therefrom.

15. A mount assembly for attaching a cradle to a vehicle frame having a frame aperture for supporting a vehicle subsystem, the mount assembly comprising:
  an inner sleeve defining an inner sleeve aperture having a first aperture portion characterized by a first diameter and a second aperture portion characterized by a second diameter;
  a bushing configured to extend through the first aperture portion and having a bushing body;
  a fuse one of directly attached to the bushing body and an integral part of the bushing body such that the bushing body defines the fuse, and configured to separate the first aperture portion from the second aperture portion; and
  a fastener configured to extend through each of the bushing body and the frame aperture for attaching the cradle to the vehicle frame;

wherein the fuse is configured to separate from the bushing body under a predetermined load and thereby permit the fastener to shift from the first aperture portion to the second aperture portion and the cradle to shift relative to the vehicle frame at the frame aperture.

16. The mount assembly of claim 15, wherein the fuse is an integral part of the bushing body, wherein the bushing body includes a bushing wall, and wherein the fuse is configured as at least one reduced-thickness section of the bushing wall.

17. The mount assembly of claim 16, wherein the bushing includes a section extending away from the bushing body and the fuse and is configured to define the second aperture portion.

* * * * *